United States Patent [19]
Bock et al.

[11] Patent Number: 5,855,255
[45] Date of Patent: Jan. 5, 1999

[54] ELECTRIC DRUM BRAKE

[75] Inventors: Gustavus Pearl Bock, Bellbook; Curtis Albert Scott, Beavercreek, both of Ohio

[73] Assignee: General Motors Corporation, Detroit, Mich.

[21] Appl. No.: 826,460

[22] Filed: Mar. 27, 1997

[51] Int. Cl.⁶ .................................................. B60T 13/74
[52] U.S. Cl. ........................................ 188/162; 188/156
[58] Field of Search .................................. 188/156–162, 188/325

[56] References Cited

U.S. PATENT DOCUMENTS

| | | | |
|---|---|---|---|
| 3,809,191 | 5/1974 | Woodward | 188/162 |
| 4,175,646 | 11/1979 | Eikelberger | 188/162 |
| 5,000,297 | 3/1991 | Shaw et al. | 188/156 |
| 5,024,299 | 6/1991 | Shaw et al. | 188/156 |
| 5,087,845 | 2/1992 | Behrens et al. | 188/162 |
| 5,219,049 | 6/1993 | Unterborn | 188/156 |
| 5,310,026 | 5/1994 | Shaw et al. | 188/156 |
| 5,785,157 | 7/1998 | Scott et al. | 188/156 |

*Primary Examiner*—Matthew C. Graham
*Attorney, Agent, or Firm*—Anthony Luke Simon

[57] ABSTRACT

An electric drum brake comprising: an electric motor including an armature for providing actuation force for the electric drum brake and a backing plate comprising a substantially flat disk portion, a support section located radially outward from a center of the flat disk portion and a substantially cylindrical wall projecting out of the support section as a continuous structure thereof, wherein an armature for the electric motor is located substantially within the substantially cylindrical wall.

4 Claims, 3 Drawing Sheets

ELECTRIC DRUM BRAKE

BACKGROUND OF THE INVENTION

One known alternative to a hydraulic drum brake is an electric drum brake, examples of which are set forth in U.S. Pat. Nos. 5,310,026, 5,219,049, 5,024,299 and 5,000,297. The electric drum brake typically includes an electric motor that drives an actuator for converting the rotational motion of the motor to linear motion output. The linear motion output of the actuator acts, through one or more levers, on the brake shoes, causing the desired release and apply of the brake shoes against the brake drum.

SUMMARY OF THE PRESENT INVENTION

It is an object of this invention to provide an electric drum brake apparatus.

Advantageously, this invention provides an electric drum brake apparatus with an improved backing plate structure.

Advantageously, according to this invention, the electric drum brake has a backing plate to which mounts the electric motor, the rotary to linear motion converter, the actuator and the brake levers and shoes.

Advantageously, the backing plate according to this invention provides improved protection to the electric brake components from road dust and water while comprising an efficient means for mounting of the brake components.

Advantageously, then, according to a preferred example of this invention, an electric drum brake is provided with a back plate comprising a substantially flat disk portion, a support section located radially outward from a center of the flat disk portion and a substantially cylindrical wall projecting out of the support section as a continuous structure thereof. An armature for an electric motor is located axially and radially within the substantially cylindrical wall.

BRIEF DESCRIPTION OF THE DRAWINGS

The present invention will now be described by way of example with reference to the following drawings in which.

DETAILED DESCRIPTION OF THE INVENTION

Figure 1:
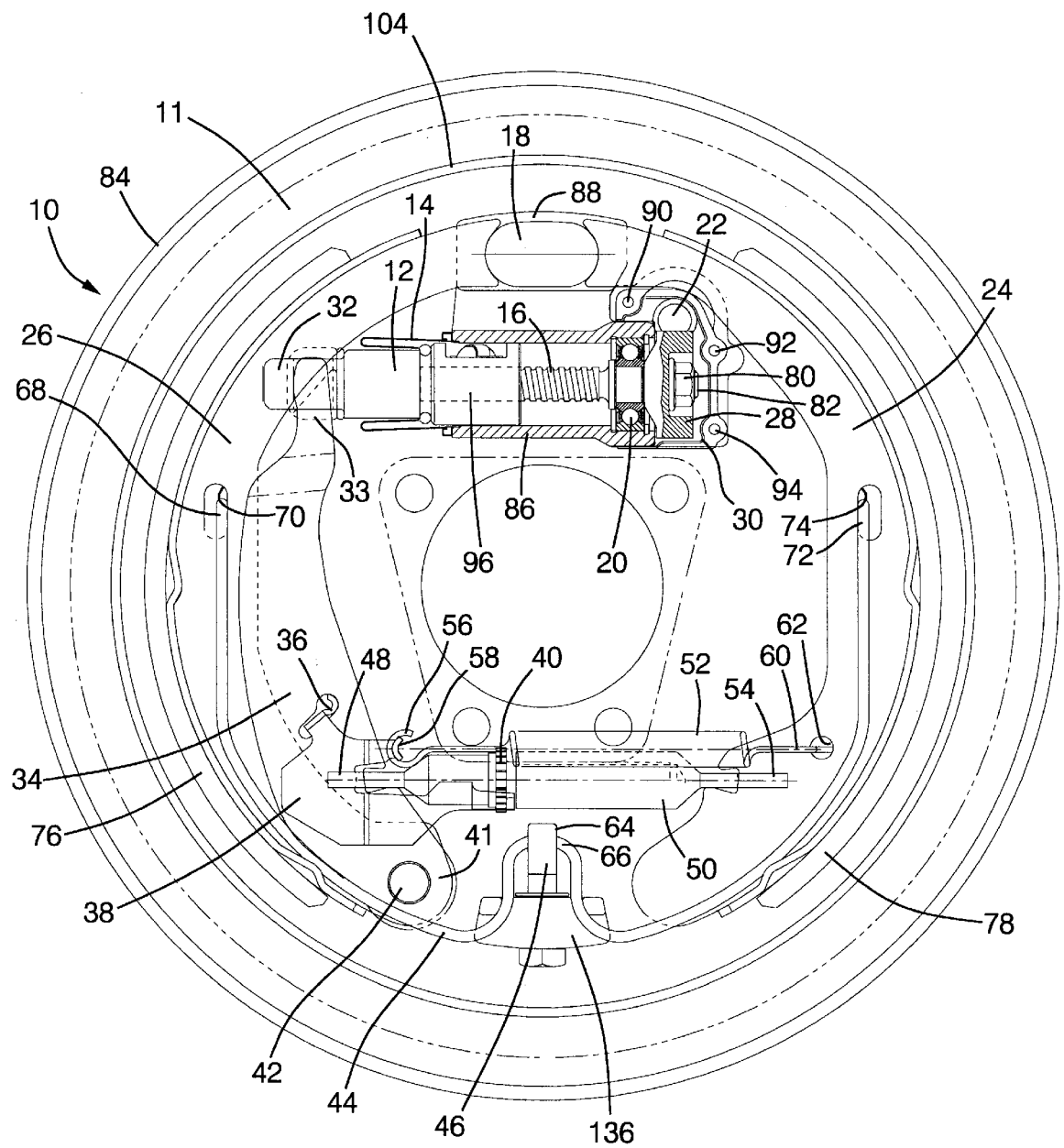
FIGS. 1 and 2 illustrate views of an electric brake according to this invention.

Referring now to FIG. 1, the view of the electric drum brake shown includes a facial view of the backing plate 11 and the components including the ball screw actuator 16, lever 34, adjuster/actuator 38, adjustable strut 50 and the shoes 24 and 26. The drum is omitted from this view, allowing the components mounted to the backing plate 11 to be seen.

According to the preferred embodiment of this invention, the backing plate 11 is a single cast structure that includes the peripheral annular shield 84 and, radially interior thereof, the secondary annular shield 104.

Figure 2:
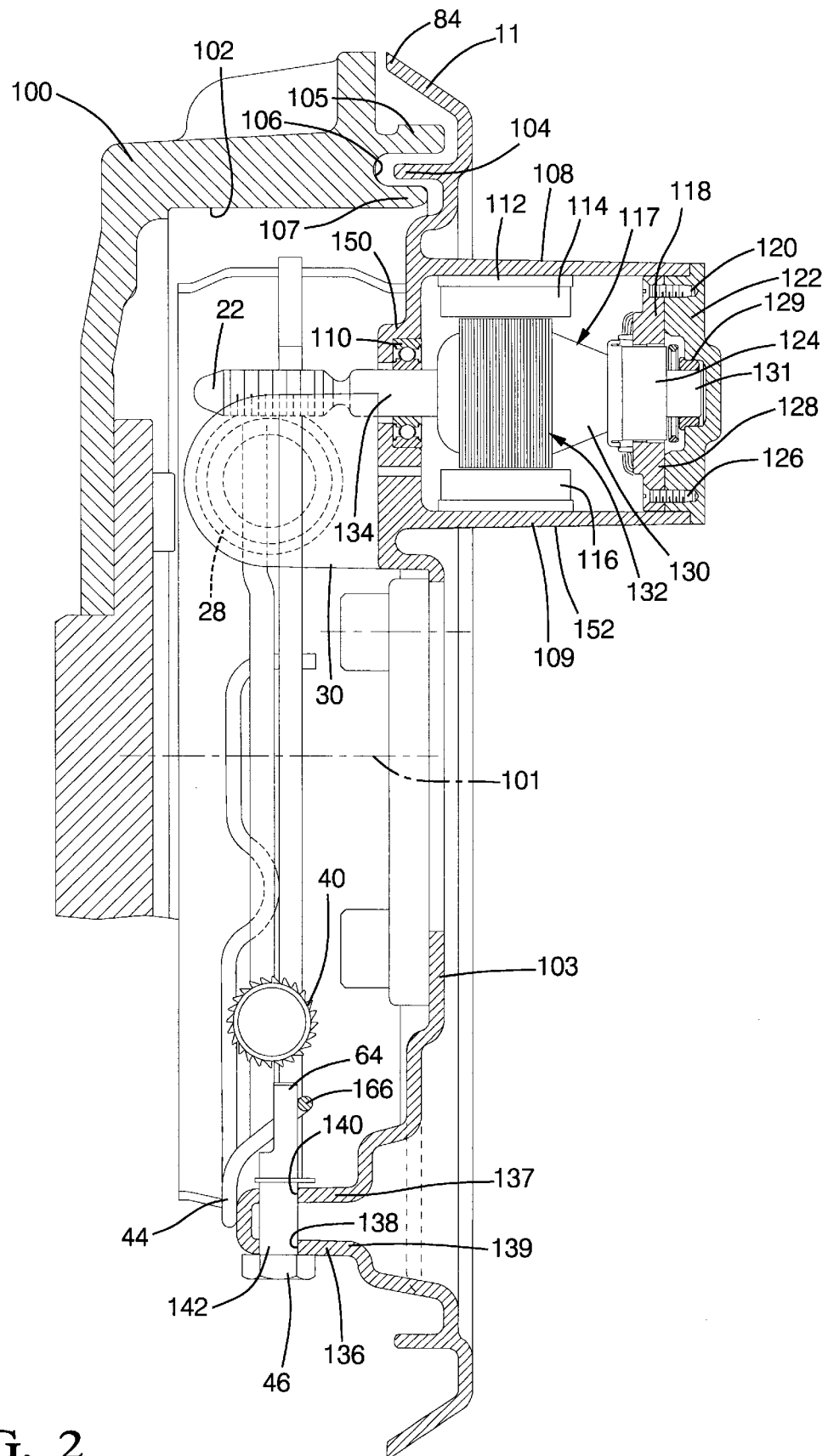

Referring now also to FIG. 2, the backing plate also includes, as part of the singular casting, the gear cover 30 and the retainer 136 for the spring retainer pin 46. The retainer 136 includes two parallel retainer walls 137 and 139 that extend out of backing plate 11 perpendicular to the flat disk portion 103 in a direction opposite the direction that wall 108 projects. The walls 137 and 139 include holes 140 and 138, coaxially aligned, receiving body portion 142 of retaining pin 46, aligning pin 46 vertically as shown in FIG. 2, or, more specifically, aligning the axis of retaining pin 46 parallel to the flat surface of flat disk portion 103.

The cover plate for the gear cover 30 (cover plate omitted from the view in FIG. 1) is mounted to the gear cover 30, for example, through screws secured in tapped holes 90, 92 and 94. Within the gear cover 30, the helical gear 28 engages the worm gear 22 on the end of the motor armature shaft 134 (FIG. 2). Rotational motion of the worm gear 22 causes rotational motion of the helical gear 28. The helical gear 28 is secured on the end 82 of ball screw 16 by nut 80 and, as the gear 28 rotates, the ball screw 16 also rotates. The ball screw 16 is maintained in place by bearing 20 mounted in the actuator housing 86. The actuator housing 86 is secured to the backing plate 11 through its base 88, which is maintained in place by the anchor pin 18 in a known manner.

Within the actuator housing 86, ball nut 96 moves linearly in response to rotational motion of the ball screw 116. When the ball screw 116 rotates in a first direction, ball nut 96 extends linearly in a direction away from helical gear 28. When the ball screw 16 rotates in the opposite direction, ball nut 96 moves linearly in the opposite direction towards helical gear 28. Attached to the ball nut 96 is a ball screw sleeve 12 that receives the end of the ball screw 16 extending through the ball nut 96. An actuator end 32 attached to the ball screw sleeve 12 engages the end 33 of lever 34 causing the lever 34 to pivot in response to linear motion of the ball screw 96 and the actuator end 32.

Lever 34 is attached to the adjuster actuator 38 and the adjustable strut 50, which includes adjuster screw 40 and ends 48 and 54 engaging the lever 34 and the shoe 24. The adjustable strut 50 is of a type known to those skilled in the art whose axial length is adjusted by rotation of adjuster screw 40, which, in a known manner, occurs automatically by adjuster actuator 38 as the friction surfaces 76 and 78 of the brake shows wear. Strut spring 52, having a first end 60 seated in hole 62 in shoe 24 and a second end 56 seated in a spring seat 58 in of adjuster actuator 38, provides retracting force maintaining the shoes 24 and 26 engaged with the adjustable strut 50.

As rotational motion of the ball screw 16 in one direction causes extension of the actuator end 32 and the end 33 of lever 34, lever 34 pivots at the point where it engages end 48 of the adjustable strut 50 causing the end 41 of the lever 34 to move inward. Shoe 26 is pivotably attached to the end 41 of lever 34 through lever pin 42. As the end 41 of the lever 34 moves inwardly, the shoe 26 is pulled away from the brake drum. Similarly, through adjustable strut 50 and strut spring 52, the shoe 24 is also retracted away from the drum.

When the ball screw 16 rotates in the opposite direction causing the actuator end 32 to retract, the lever 34 pivots at the point where it engages the adjustable strut 50 end 48 in the opposite direction extending lever end 41. As lever end 41 extends, through lever pin 42, the shoe 26 extends toward the drum engaging the friction material 76 against the drum. Similarly, through the adjustable strut 50, shoe 24 is also extended outwardly toward the drum so that its friction surface 78 engages the drum, providing friction braking to a vehicle wheel. This type of brake configuration is known as a leading-trailing brake configuration in which shoe 24 is the primary shoe and shoe 26 is the secondary shoe.

In FIG. 2, the brake drum 100 is shown with the brake unit. At the radial exterior of the backing plate 11, the annular dust cover 84 and annular secondary dust shield 104 are shown engaging the drum 100. As can be seen, the secondary dust shield 104 extends into an annular groove 106, which is formed between the annular ribs 105 and 107 on the drum 100. The result is that the features 105, 104 and 107 are interdigitated providing an effective dust and water shield for the brake unit.

Within that backing plate 11, located at a point off-center from the wheel axis 101, the material of the plate thickens to form a support portion 150 at which point the motor 109 is attached.

Figure 3:
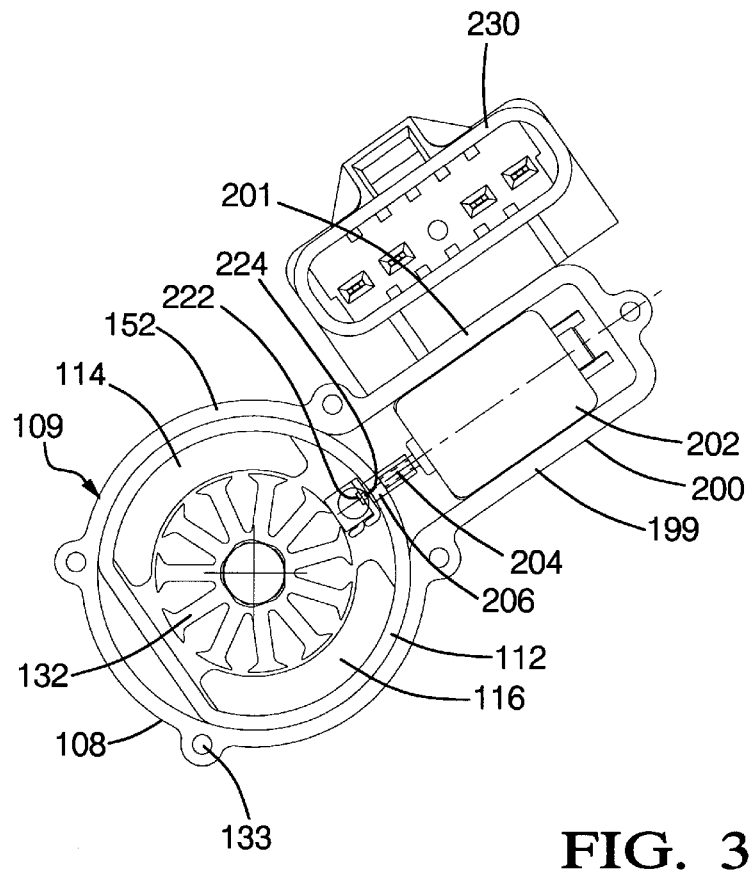
FIGS. 3 and 4 illustrate views of the motor and park braked mechanism for the electric brake according to this invention.

The housing of the motor comprises wall 108 which is integrally cast into the backing plate 11 and, as can be seen now also with reference to FIG. 3, extends from the support portion 150 as a substantially circular cylindrical projection with an open end. Within the support portion 150, bearing 110 is mounted fixedly in place and receives the worm gear end of armature shaft 134. At the opposite end of armature shaft 134, end 131 engages bushing 129 and cover plate 122, which is mounted on the end of the projecting wall 108, closing the motor housing.

Commutator 124 is provided at the end 131 of the shaft 134 and engages brushes of a known type held in place by brush holders 118 and 128, which are affixed to the end plate 122 by screws 120 and 126. The motor armature 117, along with magnets 114 and 16 and flux ring 112 are all located within the substantially circular cylindrical wall 108. The motor armature 117 comprises conventional armature winding 130 and lamina stack 132 (all shown schematically) that operate together with the commutator 124, brushes and the brush holders 118 and 128 and magnets 114 and 116 maintained in place by a flux ring 112 to provide a conventional DC brush motor. The rotary output of the motor 109 drives worm gear 28, which engages helical gear 28 of the ball screw and ball nut actuator.

Figure 4:
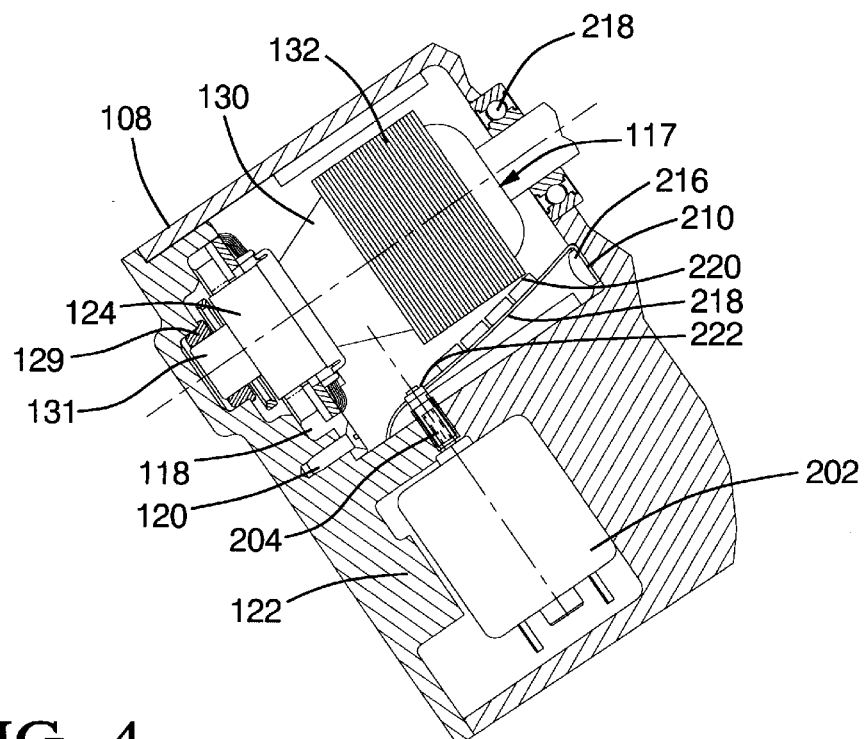

Referring now to FIGS. 3 and 4, the protruding wall 108 forming the substantially cylindrical housing for the motor 109 is not a complete circular cylinder. Instead, the wall 108 extends into walls 199 and 201, comprising part of a rectangular cylinder 200 forming the housing for the park brake motor 202. Like the motor housing 108, the rectangular cylinder 200 forming the park brake motor housing is also integrally formed with the backing plate 11 as features integrally constructed through the casting of plate 11. A plurality of holes 133 in walls 108, 199, 200 and 201 are tapped and provide means for mounting the cover plate 122, for example, through screws (not shown).

With reference to FIGS. 3 and 4, the operation of the park brake mechanism for the drum brake can be understood. The motor 202 is a conventional DC brush motor that has a threaded shaft 204. The threaded shaft engages threaded piston 206 in a power screw configuration. The piston 206 is affixed, for example, through a screw 222 to the latch spring 218 via hole 224 in the latch spring 218, maintaining the piston 206 fixed with respect to the latched spring 218. As the motor 202 causes the threaded shaft 204 to rotate in one direction, the threaded piston 206, through a power screw type operation, extends, moving the latch spring 218 toward lamina 132 of armature 117. As the motor 202 rotates threaded shaft 204 in the opposite direction, the threaded piston 206, through the power screw type operation, retracts, moving the latch spring 218 away from lamina 132 of armature 117.

The end 210 of the latch spring 218 distal from the piston 206 is affixed via screw 216 to the backing plate 11, and allows cantilever pivoting of the latch spring 218 when piston 206 extends and retracts. On the spring 218, several lamina engagers 220 are formed as tabs stamped as part of the spring 218 and bent ninety degrees toward the armature 117.

When the motor 202 is operated so that the piston 206 is extended, the latch spring 218 and lamina engagers 220 move toward the motor armature 117 until they engage into an open space between adjacent extending arms of the lamina 132, at which point the motor is rotationally locked in place and prevented from further rotation. This mechanism shown is useful as a park brake mechanism that operates as follows.

When the vehicle park brake is activated, the motor 109 operates to engage the brake shoes 24 and 26 against the brake drum 100. When the brake shoes 24 and 26 are engaged against the brake drum, the motor 202 is activated to extend piston 206 to engage the lamina engagers 220 on the latch spring 218 with the lamina 132. The lamina engagers 220 lock the armature 117 in place by extending between adjacent arms on the lamina. When this occurs, power to motor 109 is removed and the motor remains locked in place against the back pressure caused by the mechanics of the brake system and the wheel brake is maintained in the park brake state.

In the event that the lamina engagers 220 abut against a flat of an arm of the lamina 132, the motor 109 still obtains a locked state as follows. Once the brake shoes are engaged against a brake drum to achieve the park brake status of the brake and motor 202 extends piston 206, power to the motor 109 is removed. As the power is removed, return forces in the brake mechanism cause the motor armature 117 to rotate in the reverse direction. The armature 117 so rotates until the lamina engagers 220 slip into an open space between adjacent arms of the lamina 132 of the armature 117, at which point the motor 109 is rotationally locked. To release the park brake mechanism, motor 202 is driven in the reverse direction retracting piston 206, retracting latch spring 218 and lamina engagers 220 away from the armature 117.

Another example park brake mechanism is disclosed in copending U.S. patent application, Ser. No. 08/828,011 filed Mar. 27, 1997 and assigned to the assignee of this invention now U.S. Pat. No. 5,785,157.

Power to the motors 109 and 202 is provided through the connector 230 of a conventional type known to those skilled in the art.

According to the preferred example of this invention, an advantageous electric brake assembly has been achieved with an improved backing plate 11 made of a single cast piece. The backing plate 11 is cast for example, from aluminum or steel or other suitable material in a casting mold including features to allow formation of the body portion 150, the extending open end cylinder 108 forming the housing of the motor 109 and the extending rectangular cylinder 200 forming the housing for the park brake motor 202. This allows mounting of the motors 109 and 202 within an integrally cast part of the backing plate 11, eliminating potential water and road debris leaks into the motor compartment. The motors are easily sealed in place by the motor cover 122, which is affixed to the casting by suitable means, for example, a plurality of screws (not shown) in screw holes 133.

We claim:

1. An electric drum brake comprising:
   an electric motor including an armature for providing actuation force for the electric drum brake;
   a backing plate comprising a substantially flat disk portion, a support section located radially outward from a center of the flat disk potion and a substantially circular cylindrical wall projecting out of the support section as a continuous structure therof, wherein an armature for the electric motor is located substantially within the substantially circular cylindrical wall, wherein the armature is axially aligned perpendicular to the substantially flat disk portion and has an end extending through an opening in the substantially flat disk portion; and a ball screw mechanism mounted to the backing plate, wherein the armature transfers rotational motion to the ball screw mechanism, wherein the ball screw mechanism is axially aligned parallel to the substantially flat disk potion and perpendicularly to the armature.

2. An electric drum brake comprising:

an electric motor including an armature for providing actuation force for the electric drum brake and a backing plate comprising a substantially flat disk potion a support section located radially outward from a center of the flat disk portion and a substantially circular cylindrical wall projecting out of the support section as a continuous structure thereof, wherein an armature for the electric motor is located substantially within the substantially circular cylindrical wall, wherein the backing plate also comprises a substantially rectangular cylindrical wall extending out of and structurally continuous with the support section, wherein a park brake motor is located within the substantially rectangular cylindrical wall.

3. An electric drum brake according to claim 2, wherein the substantially rectangular cylindrical wall merges with the substantially cylindrical wall to form a single contiguous wall extending perpendicular to the substantially flat disk portion.

4. An electric drum brake comprising:

an electric motor including an armature for providing actuation force for the electric drum brake and a backing plate comprising a substantially flat disk portion, a support section located radially outward from a center of the flat disk portion and a substantially circular cylindrical wall projecting out of the support section as a continuous structure therof, wherein an armature for the electric motor is located substantially within the substantially circular cylindrical wall, wherein the backing plate includes, integrally formed therewith, a retainer pin receptacle located off center in the plate opposite a center axis from the support section, wherein the retainer pin receptacle includes a first retaining wall perpendicular to the flat disk portion projecting in a direction opposite the direction of the substantially circular cylindrical wall and a second retaining wall parallel to the first retaining wall, wherein the first and second retaining walls define first and second coaxial openings therein, also comprising a retaining pin mounted within the first and second openings with an axis thereof parallel to a flat surface the substantially flat disk portion.

\* \* \* \* \*